(12) United States Patent
Kuroyanagi et al.

(10) Patent No.: US 7,663,554 B2
(45) Date of Patent: Feb. 16, 2010

(54) WIRELESS COMMUNICATION DEVICE

(75) Inventors: Hitoshi Kuroyanagi, Suzuka (JP); Tatsushi Aiba, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 420 days.

(21) Appl. No.: 10/553,343

(22) PCT Filed: Apr. 15, 2004

(86) PCT No.: PCT/JP2004/005420

§ 371 (c)(1),
(2), (4) Date: Nov. 13, 2006

(87) PCT Pub. No.: WO2004/093443

PCT Pub. Date: Oct. 28, 2004

(65) Prior Publication Data

US 2007/0096994 A1    May 3, 2007

(30) Foreign Application Priority Data

Apr. 17, 2003  (JP) .............................. 2003-113505
Apr. 9, 2004   (JP) .............................. 2004-116185

(51) Int. Cl.
*H01Q 1/24* (2006.01)
(52) U.S. Cl. ................ 343/702; 343/700 MS
(58) Field of Classification Search .......... 343/700 MS, 343/702; 455/90.3
See application file for complete search history.

(56) References Cited

U.S. PATENT DOCUMENTS

| 6,201,501 | B1 | 3/2001 | Arkko et al. |
| 6,339,400 | B1 | 1/2002 | Flint et al. |
| 2003/0050032 | A1 | 3/2003 | Masaki |
| 2003/0072131 | A1 | 4/2003 | Hood et al. |
| 2005/0093753 | A1* | 5/2005 | Masaki .................... 343/702 |
| 2005/0227702 | A1* | 10/2005 | Nishimura et al. .......... 455/454 |
| 2007/0184883 | A1* | 8/2007 | Tanaka .................... 455/575.7 |
| 2008/0225803 | A1* | 9/2008 | Tanaka .................... 370/338 |

FOREIGN PATENT DOCUMENTS

| EP | 1 271 793 A2 | 1/2003 |
| EP | 1 583 061 A1 | 10/2005 |
| JP | 02-078383 A | 3/1990 |
| JP | 04-043075 U | 4/1992 |
| JP | 04-134907 A | 5/1992 |
| JP | 06-037695 A | 2/1994 |
| JP | 07-183844 A | 7/1995 |
| JP | 09-188196 A | 7/1997 |
| JP | 11-098046 A | 4/1999 |
| JP | 2000-172376 A | 6/2000 |

(Continued)

*Primary Examiner*—Tan Ho
(74) *Attorney, Agent, or Firm*—Birch, Stewart, Kolasch & Birch LLP

(57) ABSTRACT

In a liquid crystal television device that is a wireless communication device, speaker storage sections are integrally formed with a main body section containing parts such as a liquid crystal panel section. Although the main body section is electromagnetically shielded, the speaker storage sections are not electromagnetically shielded. Antennas are provided along with speakers in speaker storage sections so as to have directions of installation different from each other by 90 degrees. This realizes a wireless communication device including an antenna structure capable of improving transmitting/receiving sensitivity in all directions.

14 Claims, 5 Drawing Sheets

FOREIGN PATENT DOCUMENTS

| | | |
|---|---|---|
| JP | 2001-156543 A | 6/2001 |
| JP | 2001-312336 A | 11/2001 |
| JP | 2001-312339 A | 11/2001 |
| JP | 2002-261646 A | 9/2002 |
| JP | 2002-293131 A | 10/2002 |
| JP | 2003-087023 A | 3/2003 |
| WO | WO 00/38475 A2 | 6/2000 |

* cited by examiner

WIRELESS COMMUNICATION DEVICE

TECHNICAL FIELD

The present invention relates to a wireless communication device. The present invention is favorably applied to portable devices, such as a liquid crystal television device, a PDP (Plasma Display Panel) television device, and a CRT (Cathode Ray Tube) television device, which can be carried around.

BACKGROUND ART

In recent years, portable wireless communication devices, such as a liquid crystal television device and a CRT television device, which can be carried around, have become available. Wireless communication devices for transmitting/receiving a video signal by employing an SS (Spread Spectrum) wireless system based on IEEE802.11 or IEEE802.11B are proposed in these wireless communication devices. Moreover, for such wireless communication devices, not only the wireless system but also a system applicable to a next-generation cellular phone device whose speed of data transfer is increased, PHS (Personal Handy-Phone System) or Blue Tooth, are proposed.

In such a wireless system, a receiving antenna is necessary. In general, an antenna length of an antenna element for a frequency band of 2.4 GHz is around three centimeters, which is equivalent to one quarter of a radio wavelength. Such an antenna is used in an SS wireless system, Blue Tooth wireless system and the like. An antenna length of three centimeters is much shorter than an antenna length of an antenna element for frequency bands of VHF (Very High Frequency) and UHF (Ultra High Frequency) and the three-centimeter antenna is not required to have long shape such as a rod antenna.

No matter how short an antenna becomes, the antenna element may still protrudes in a noticeable manner in a portable communication device such as a compact liquid crystal television device.

In Japanese Unexamined Patent Publication 261646/2002 (Tokukai 261646/2002 (published on Sep. 13, 2002), an arrangement in which an antenna element is built inside a handgrip in a portable wireless transmitting/receiving device is disclosed. According to this arrangement, as illustrated in FIG. 5, a liquid crystal television device 50 has an arrangement in which two antenna elements 53a and 53b are built in a handgrip section 52 attached to a cabinet 51. In this arrangement, the antenna elements 53a and 53b are connected to screws 54a and 54b of the handgrip section 52, in a manner, parallel to each other. The arrangement makes it possible to have a diversity antenna structure constructed of the two antenna elements 53a and 53b.

This realizes a portable liquid crystal television device having a simple structure without (i) addition of any extra spaces and (ii) provision of any extra protruding object.

Although, in the art disclosed in the Japanese Unexamined Patent Publication mentioned above, the portable liquid crystal television device having a simple structure without (i) addition of any extra spaces and (ii) provision of any extra protruding object can be realized, there arises a problem. Unless the liquid crystal television device 50 is used in a state where the handgrip section 52 is drawn out from the cabinet (a main body of a display device) 51, sensitivity for receiving an electric wave coming from a front side of a display screen is poor and, moreover, the antennas tend to change the directions in which the antennas are respectively pointing and break easily through contact with an external object.

Namely, in the art disclosed in the Japanese Unexamined Patent Publication mentioned above, the antennas are built in the handgrip. Therefore, the positions in which the antennas are installed are on a rear side of the display section which is electromagnetically shielded. Accordingly, the sensitivity for receiving the electric wave coming from the front side of the display screen is poor. To be more specific, the handgrip section 52 in which the antenna elements 53a and 53b are built is positioned on the rear side of the cabinet 51 which is electromagnetically shielded. Therefore, unless the liquid crystal television device is used in the state where the handgrip section 52 is drawn out upward from the cabinet 51, it is difficult to receive an electric wave passing through the cabinet 51 from the front side of the display screen. Furthermore, in the cabinet 51, there exist many components which act as shields, against the electric wave to be received, such as a liquid crystal panel, wiring substrate, parts of an internal structure, or the like, in addition to the electromagnetic shield. These shields further attenuate the electric wave passing through the entire screen. This causes the sensitivity for receiving the electric wave to be further deteriorated.

Moreover, because each of the antennas is built outside the main body of the display device, contact with an external object and the like may change the direction in which the antenna is pointed. In other words, the antenna elements 53a and 53b are built in the handgrip section 52 attached on the cabinet 51, and by adjusting (i) how much the handgrip section 52 is drawn out and (ii) an angle of the handgrip section 52, the length and the direction of the antenna elements 53a and 53b inside are adjusted. Therefore, when something contacts the handgrip section 52, the directions in which the antenna elements 53a and 53b are pointed change. When the handgrip section 52 is contacted with force, the handgrip section 52 may be broken. This breakage of the handgrip section 52 means the breakage of the antennas 53a and 53b. In a case of a portable liquid crystal television device and the like, such devices are used in a variety of places based on the feature of such devices. Accordingly, compared with a fixed television device and the like, a risk of breakage as well as the possibility that something contacts the handgrip section 52 is considered to be high.

Moreover, in order to eliminate directivity of reception by providing antennas in many directions, a space on which to arrange the antennas is necessary, but it is difficult to allocate such space in the arrangement where the antennas are built in the handgrip section as described in the Japanese Unexamined Patent Publication mentioned above. In order to solve this problem, providing the antennas inside the liquid crystal television device may be considered. However, when provided inside, the antennas are covered by an electromagnetic shield such as unnecessary radiation. Accordingly, this is inconvenient for the purpose of receiving an electromagnetic wave. Furthermore, as mentioned above, there exist many components which act as shields (a liquid panel, wiring substrate, parts of the internal structure and the like) that shield the electric wave to be received inside the liquid crystal television device, and there has been a problem of these shields deteriorating the sensitivity for receiving an electric wave. Therefore, it has been difficult to provide the antennas inside the device.

The present invention is attained in view of the problems mentioned above. An object of the invention is to provide a wireless communication device having an antenna structure with improved communication sensitivity by being less influenced by the electromagnetic shield. In other words, the object of the invention is to provide a wireless communication device having an antenna structure that provides good communication sensitivity and, moreover, that does not cause the antenna to change the direction in which the antenna is pointed nor break due to contact with an external object.

DISCLOSURE OF INVENTION

A wireless communication device of the present invention, in order to achieve the object mentioned above, includes: an antenna storage section(s), which is formed integrally with a main body of the device and which is not electromagnetically shielded, in a periphery section of a display screen in the main body of the device containing a display section including the display screen; and an antenna(s) being provided inside the antenna storage section(s).

According to the structure mentioned above, the antenna is provided inside the antenna storage section, which is integrally formed with the main body section of the device and which is not electromagnetically shielded, in the periphery section of the display screen of the main body of the device containing the display section including the display screen. Therefore, the antenna can receive an electric wave without being influenced by the electromagnetic shield provided in the display section. Accordingly, communication sensitivity for sensing an electric wave including an electric wave coming from a front side of the screen is improved. Moreover, because the antenna storage section is provided in the periphery section of the display screen, the antenna is not influenced by the electromagnetic shield. At the same time, there are few shields, such as the display section, circuit substrate, and other parts, blocking the electric wave. In this respect also, the communication sensitivity is improved.

Furthermore, because the antenna is arranged inside the antenna storage section formed integrally with the main body section of the device, the antenna neither changes a direction in which the antenna is pointed nor breaks upon contact with an external object. Compared with a case in which the antenna is contained in a handgrip as in the conventional art, a storage space can be ensured and the antenna can be arranged so as to prevent directivity of reception.

This results in providing a wireless communication device including an antenna structure in which the influence of the electromagnetic shield can be suppressed and the communication sensitivity of the antenna is improved. In other words, this is effective for providing a wireless communication device including an antenna structure, which has favorable communication sensitivity and which does not cause the antenna to change the direction in which the antenna is pointed nor break due to contact with an external object.

Another wireless communication device(s) of the present invention, in order to achieve the object mentioned above, includes: an antenna storage section(s), which is formed integrally with a main body of the device and which includes a ventilation section made of plural through-holes, in a periphery section of a display screen in the main body of the device containing a display section including the display screen; and an antenna(s) being provided inside the antenna storage section(s).

According to the structure mentioned above, the antenna is provided inside the antenna storage section, which is integrally formed with the main body section of the device and which includes a ventilation section made of plural through-holes, in the periphery section of the display screen of the main body of the device containing the display section including the display screen. Therefore, the antenna can receive an electric wave without being influenced by the electromagnetic shield provided in the display section and the communication sensitivity to an electric wave including a wave coming from a front side of the screen is improved. Moreover, because the antenna storage section is provided in the periphery section of the display screen, the antenna is not influenced by the electromagnetic shield. At the same time, there are few shields, such as the display section, circuit substrate, and other parts, blocking the electric wave. In this respect also, the communication sensitivity is improved.

Furthermore, because the antenna is provided inside the antenna storage section formed integrally with the main body of the device, the antenna does not change the direction in which the antenna is pointed nor breaks upon contact with an external object. Compared with a case in which the antenna is stored in a handgrip as in the conventional art, a storage space can be ensured and the antenna can be arranged so as to prevent the directivity of reception.

This results in providing a wireless communication device including an antenna structure in which the influence of the electromagnetic shield can be suppressed and the communication sensitivity of the antenna is improved. In other words, this is effective for providing a wireless communication device including an antenna structure which has improved communication sensitivity and which does not cause the antenna to change the direction in which the antenna is pointed nor break due to contact with an external object.

Here, the number of antenna(s) provided in one of the antenna storage section mentioned above may be one or plural. Moreover, the number of antenna storage section(s) also may be plural. For example, the antenna storage sections may be provided on both right and left sides of the display screen.

In each of the wireless communication devices mentioned above, in addition to the structure mentioned above, the antenna storage sections are provided on both left and right sides of the display screen and serve as speaker storage sections, and the antenna(s) and a speaker are stored inside each of the antenna storage sections.

By using the speaker storage section for storing the speaker also as the antenna storage section, it is not necessary to add a dedicated space for storing the antenna in the wireless communication device. Moreover, compared with a structure in which the antenna storage section and the speaker storage section are separately provided in the periphery section of the display screen, design of the device can be improved.

Moreover, in each of the wireless communication devices, in addition to the structure mentioned above, two antennas can be provided in the same storage section, and each of the two antennas either in the same storage section of different storage sections, may differ in direction by 90 degrees.

This structure allows, in a state in which one antenna is provided inside each of the speaker storage sections mentioned above, one of the antennas mentioned above to have directivity in a horizontal plane stronger than directivity in a vertical plane and the other one to have the directivity in the vertical plane stronger than the directivity in the horizontal plane.

In each of the wireless communication devices, in addition to the structure mentioned above, the antenna is either an inverted L antenna or an inverted F antenna.

For a fuller understanding of the nature and advantages of the invention, reference should be made to the ensuing detailed description taken in conjunction with the accompanying drawings.

BRIEF DESCRIPTION OF DRAWINGS

FIG. 2 is a perspective view of the antenna structure.

BEST MODE FOR CARRYING OUT THE INVENTION

The present invention is further explained in details below by an exemplary embodiment and a comparative example. However, the present invention is not limited by these at all.

First, an example of a usage environment, in which a liquid crystal television device (wireless communication device) of an embodiment according to the present invention is provided, is explained with reference to FIG. 6.

Figure 6:
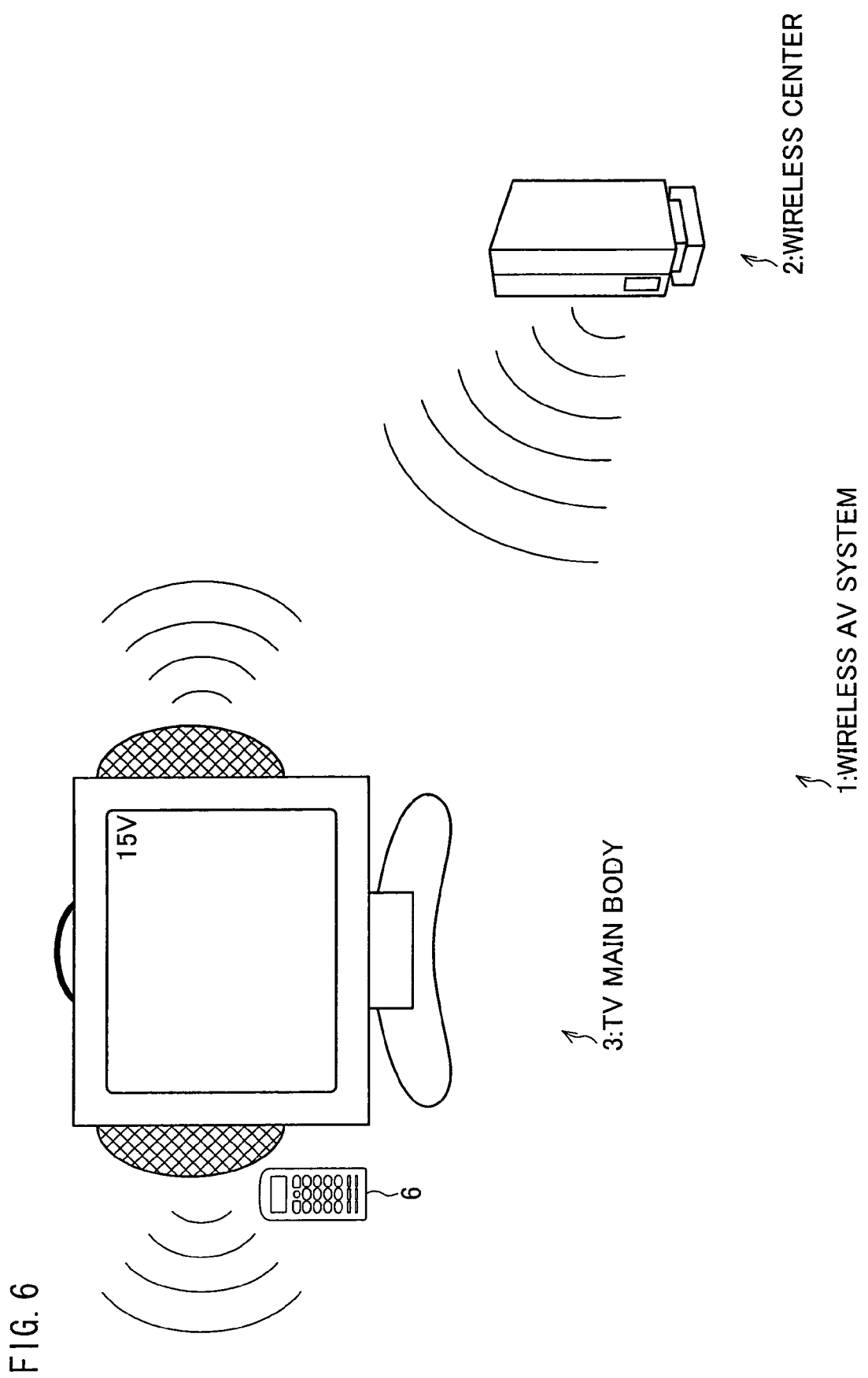
FIG. 6 is an explanatory diagram schematically illustrating a wireless AV (Audio Visual) system in which the liquid crystal television device as illustrated in FIG. 1 is provided as a main body unit of a television.

FIG. 6 is an explanatory diagram schematically illustrating a wireless AV system 1 which is a wireless TV receiver separable from a display. As illustrated in FIG. 6, the wireless AV system 1 is made of a wireless center unit (hereinafter, called wireless center) 2 as a base device and a main body unit 3 of a television (TV) (hereinafter, called TV main body) as a portable terminal (wireless terminal). The wireless center 2 and the TV main body 3 (wireless communication device) as a pair construct a wireless transmission network.

As illustrated in FIG. 6, the TV main body 3 is wireless and includes a built-in battery. The TV main body 3 also includes a remote controller 4, and an operation of a video deck and the like by the remote controller is possible. Moreover, the wireless center 2 is connected to AV equipment and the like, such as an antenna for BS (Broadcast Satellite), U/V (UHF/VHF), and the like, a DVD (Digital Versatile Disk) player and a video deck. A video image and/or sound data are/is transmitted from the wireless center 2 to the TV main body 3 wirelessly.

The TV main body 3 is a thin-model display device, which is separable from the wireless center 2, and mobile or portable by building in a battery. The concept of the TV main body 3 is broad and includes various display devices such as a liquid crystal television (hereinafter, called liquid crystal TV), inorganic EL/organic EL displays, and plasma display. The TV main body 3 is not limited to being a kind of display systems. Hereinafter, the TV main body 3 of this embodiment is described as a thin-model display device by taking a liquid crystal TV as an example.

Figure 1:
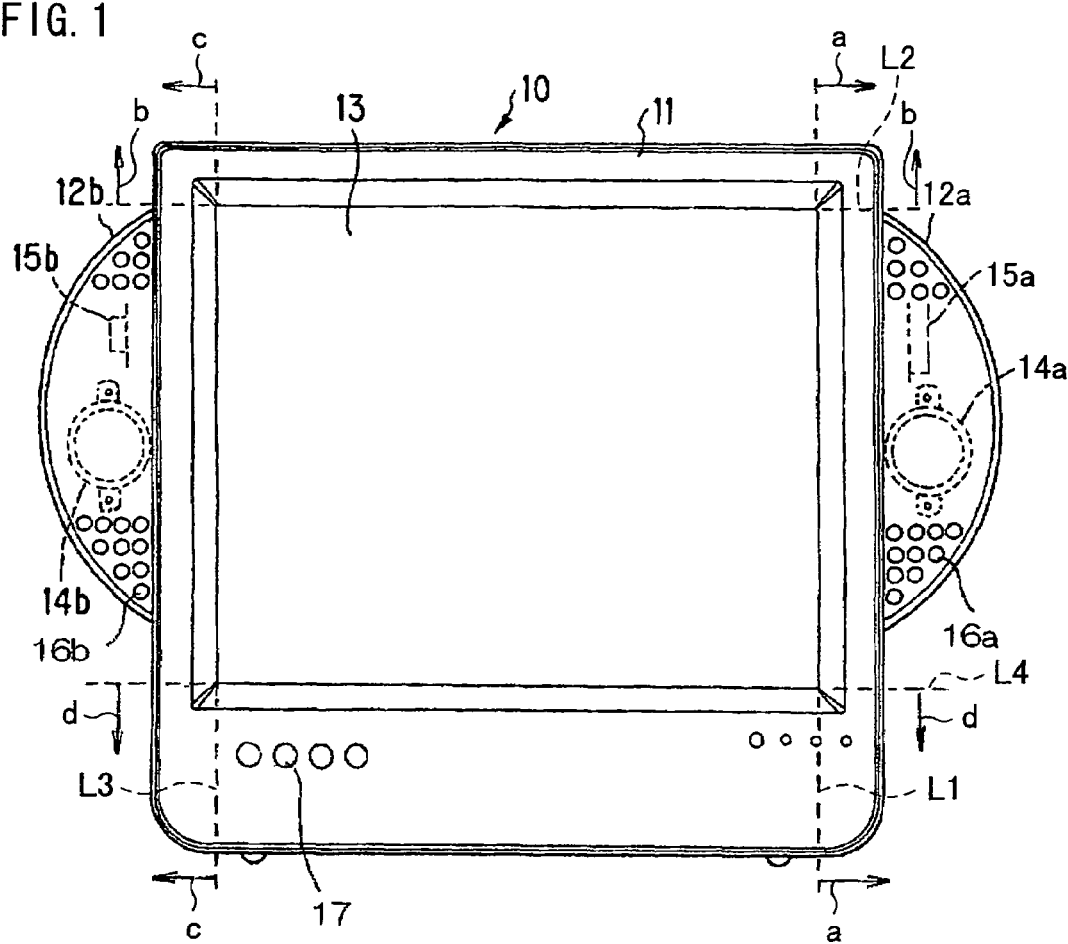
FIG. 1 is a front view of a liquid crystal television device having an antenna structure provided in a wireless communication device thereof according to the present invention.

FIG. 1 is a front view of a liquid crystal television device including an antenna structure of a wireless communication device according to the present invention, and FIG. 2 is a perspective view of the antenna structure. FIG. 3 is an exploded perspective view of this liquid crystal television device.

As illustrated in FIG. 1, this liquid crystal television device 10 includes a main body section 11 in which parts such as a liquid crystal panel section (display section) 13 are contained, and semicircle speaker storage sections (antenna storage sections/speaker storage sections) 12a and 12b provided on both left and right sides of the main body section 11. These are integrally formed.

As illustrated in FIG. 3, exterior packages of this main body section 11 and the speaker storage sections 12a and 12b are made of a front cabinet 23 and a rear cabinet 24. In the front cabinet 23, front exterior packages of the main body section 11 and the speaker storage sections 12a and 12b are integrally formed. In the rear cabinet 24, rear exterior packages of the main body section 11 and the speaker storage sections 12a and 12b are integrally formed. The front cabinet 23 and rear cabinet 24 have a structure, in which the cabinets 23 and 24 contain parts therebetween, and the cabinets 23 and 24 are fixed by a screw and the like.

As mentioned above, in the main body section 11, parts such as the liquid crystal panel section 13 are contained. Moreover, the main body section 11 is provided with an electromagnetic shield so that an electromagnetic wave equal to or more than a certain criterion does not leak outside. On the other hand, on the speaker storage sections 12a and 12b (on an outer surface), sound emission openings 16a and 16b, which are through-holes to the inside, are formed. Inside the speaker storage sections 12a and 12b, speakers 14a and 14b and antennas 15a and 15b are included. The speaker storage sections 12a and 12b are not electromagnetically shielded.

Moreover, on a display surface side of the main body section 11, a heat release opening 17, which is a through-hole to the inside, is formed. The heat release opening 17 releases heat from inside the main body section 11. All of the sound emission openings 16a and 16b and the heat release opening 17 are ventilation sections that provide ventilation to the inside of the device. An area on which the heat releasing opening 17 is formed on the main body section 11 is a periphery section of the liquid panel section 13. The area is outside an edge section of the display screen. Accordingly, the area as well as the speaker storage sections 12a and 12b are not electromagnetically shielded.

In this way, the antennas 15a and 15b are provided in the speaker storage sections 12a and 12b, which are not electromagnetically shielded. These speaker storage sections 12a and 12b are provided on external sides of the display screen of the display section 13 and in positions apart from the display section 13 that is electromagnetically shielded. Accordingly, an improved transmitting/receiving sensitivity (communication sensitivity) of the antennas 15a and 15b provided inside the speaker storage sections 12a and 12b can be maintained.

Here, an external side of the display screen of the display section 13 is a side outside an edge section of the display screen of the display section 13, in any direction illustrated by the arrows in FIG. 1. Namely, in the drawing, the side outside the display screen of the display section is any of (i) an outer area illustrated by arrows a directed to the right from a right edge section of the display screen, the edge section being illustrated by a dotted line L1; (ii) an outer area illustrated by arrows b directed right from an upper edge section of the display screen, the edge section being illustrated by a dotted line L2; (iii) an outer area illustrated by arrows c directed to the left from a left edge section of the display screen, the edge section being illustrated by a dotted line L3; and (iv) an outer area illustrated by arrows a directed downward from a bottom edge section of the display screen, the edge section being illustrated by a dotted line L4. In other words, the external side of the display screen of the display section is the periphery section of the display screen.

Figure 2A:
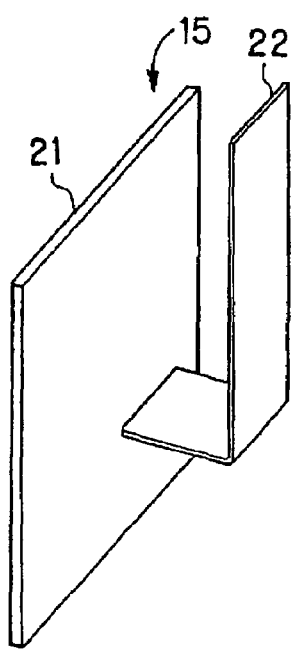
FIGS. 2(a) and 2(b) respectively illustrate an inverted L antenna and an inverted F antenna.
Figure 2B:
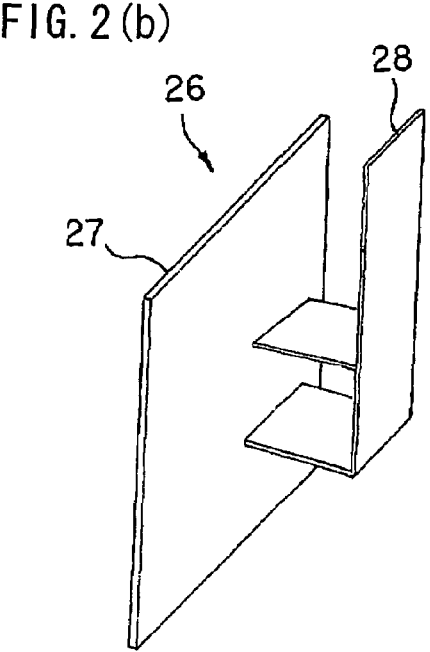
Figure 3:
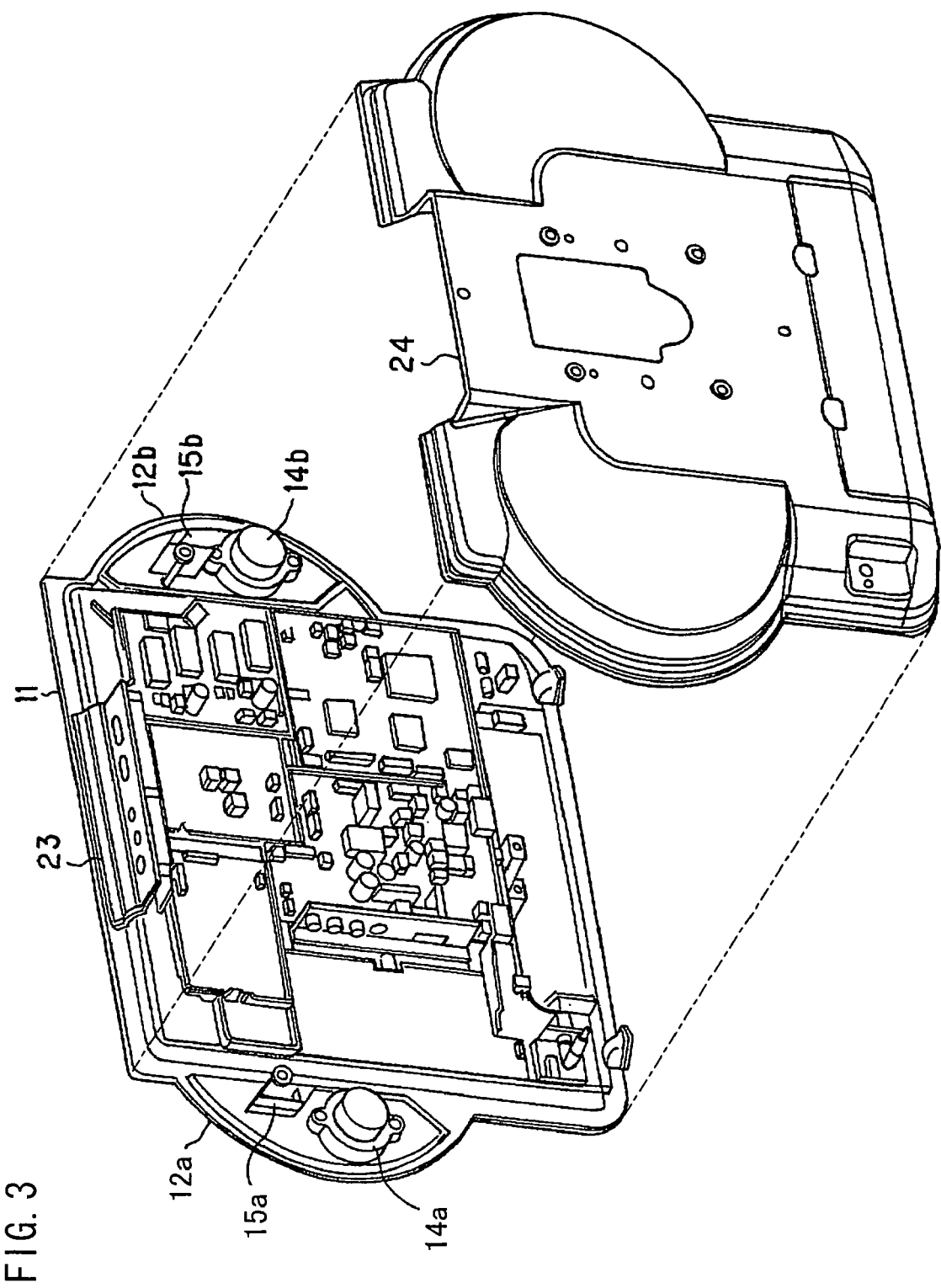
FIG. 3 is an exploded perspective view of the liquid crystal television device.

FIG. 2 is a perspective view of a structure of the antennas 15a and 15b. FIGS. 2(a) and 2(b) respectively illustrate an inverted L antenna 15 and an inverted F antenna 26. The inverted L antenna 15 is made of an antenna substrate 21 on an orthogon and an antenna element section 22 made of a metal plate whose side surface is shaped in an inverted L. The inverted F antenna 26 is made of an antenna substrate 27 on an orthogon and an antenna element section 28 made of a metal plate whose side surface is shaped in an inverted F. Either type of antenna may be used as the antennas 15a and 15b. In this embodiment, the inverted L antenna 15 is used.

In the example illustrated by FIG. 1 and FIG. 3, the antennas 15a and 15b are provided so as to have their directions of installation different from each other by 90 degrees. Here, the antennas 15a and 15b are respectively provided above the speakers 14a and 14b. This installation allows the antenna 15a to have directivity in a horizontal plane stronger than directivity in a vertical plane and the other antenna 15b to have the directivity in the vertical plane stronger than the directivity in the horizontal plane, in a state in which the antennas 15a and 15b are respectively provided in the speaker storage sections 12a and 12b. According to the usage environment, in a state in which the antennas 15a and 15b are respectively provided in the speaker storage sections 12a and 12b, the antennas 15a and 15b may be installed in the same direction.

The antenna element section 22 is electrically connected to the wireless transmitting/receiving circuit in the main body section 11. These two antennas 15a and 15b serve as a diversity antenna.

Figure 4:
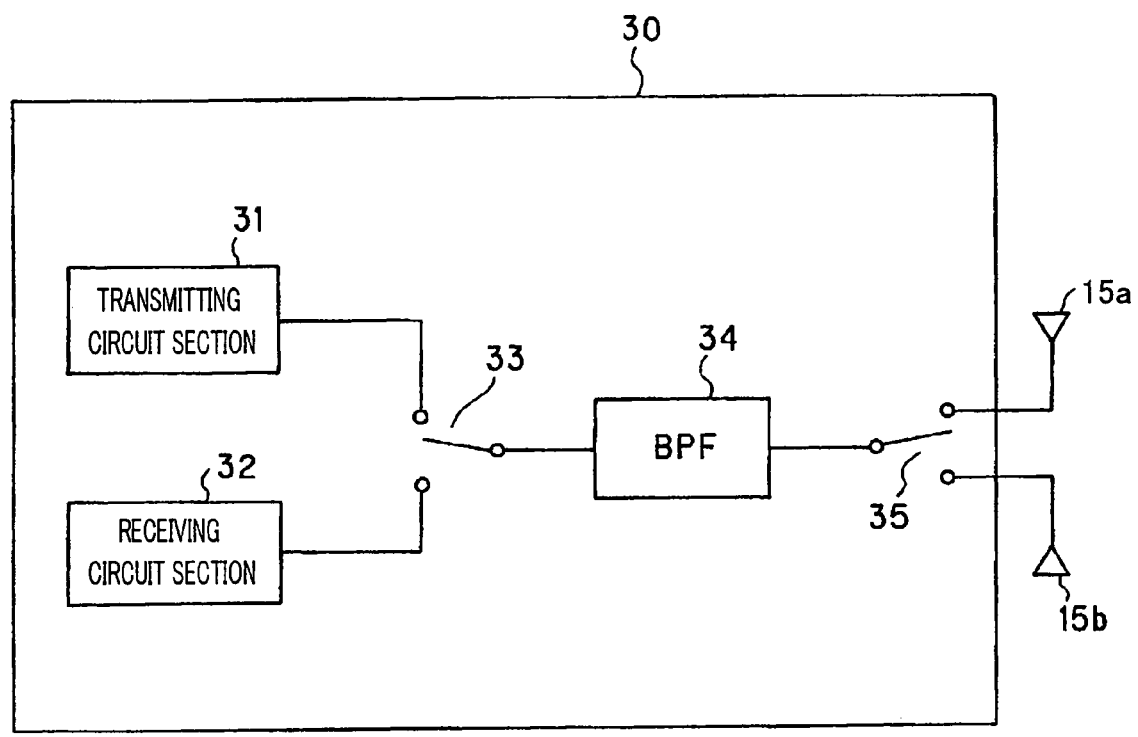
FIG. 4 is a block diagram of a wireless transmitting/receiving circuit.
Figure 5:
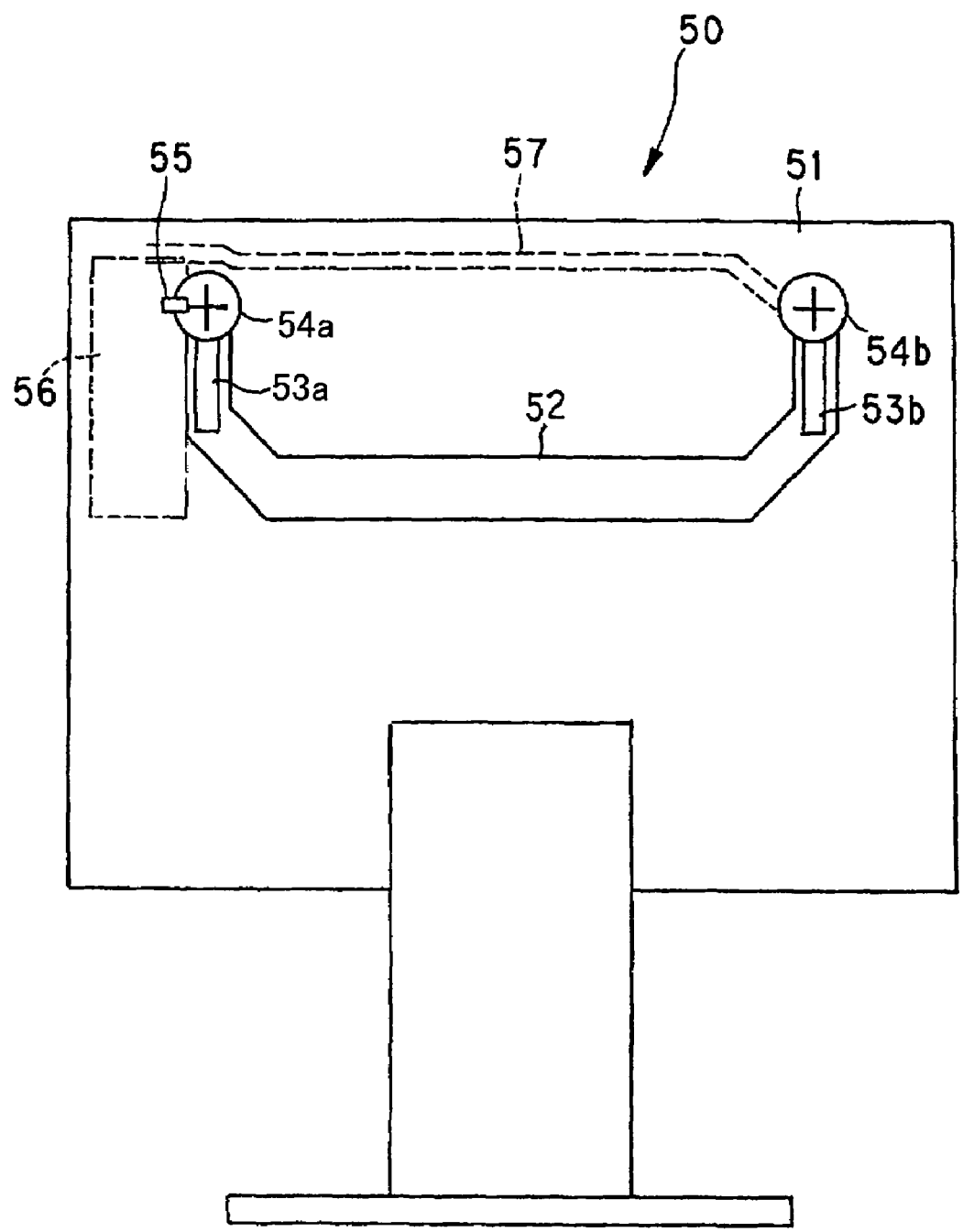
FIG. 5 is a rear view of an antenna structure in a conventional liquid crystal television device.

FIG. 4 is a block diagram of a wireless transmitting/receiving circuit 30. The wireless transmitting/receiving circuit 30 includes a transmitting circuit section 31 for transmitting a wireless signal, a receiving circuit section 32 for receiving a wireless signal, a band pass filter (BPF) 34 for transmitting/receiving a wireless signal within a frequency range only to/from the antennas 15a and 15b, a changeover switch 33 for switching connections of the transmitting circuit section 31 and the receiving circuit section 32 to the BPF 34 temporally, and a diversity switch for switching connections of the antennas 15a and 15b to the BPF 34 temporally. The diversity switch 35 is a time-share switch for connecting the wireless transmitting/receiving circuit section 30, by switching, to the antennas 15a and 15b constituting the diversity antenna temporally, using, for example, a micro computer (not illustrated).

By this structure for connection, the BPF 34 allows only the wireless signals within the frequency band of the wireless signals used out of the wireless signals inputted into/outputted from the wireless transmitting/receiving circuit section 30 to pass through the BPF 34, thereby causes the antennas 15a and 15b to serve as a diversity antenna.

As mentioned above, in the liquid crystal television display 10 of this embodiment, the antennas 15a and 15b are stored in the speaker storage sections 12a and 12b that are not covered by an electromagnetic shield, the speaker storage sections 12a and 12b being provided on the outside of the main body section 11 covered by the electromagnetic shield. This is advantageous in the respect of transmitting/receiving sensitivity. Moreover, in the speaker storage sections 12a and 12b, there are few electromagnetic shields such as a liquid crystal panel, substrate, and other parts. In this point, the above structure is also advantageous in the respect of transmitting/receiving sensitivity. Furthermore, because the antennas 15a and 15b are contained in the speaker storage sections 12a and 12b, the antennas neither change the direction in which the antennas are pointed nor break upon contact with an external object. Furthermore, compared with a case where antennas are stored in a handgrip as in the conventional art, a space for the storage sections can be ensured. Accordingly, the antennas 15a and 15b can be arranged so that the directions of the installation of these antennas are different from each other by 90 degrees. Therefore, storing the antennas 15a and 15b in the speaker storage sections 12a and 12b is effective to improve the transmitting/receiving sensitivity in all directions.

In the embodiment of the present invention, the antennas 15a and 15b are arranged so as to be stored in the speaker storage sections 12a and 12b that is not covered by the electromagnetic shield, the speaker storage sections 12a and 12b being provided to the outside of the main body section 11 covered by the electromagnetic shield. However, the antennas can be provided so as to still have an improved communication sensitivity, when the antennas 15a and 15b are provided in the periphery section of the display screen. The periphery section does not need the electromagnetic shield. In FIG. 1, the periphery section is illustrated by the dotted lines L1 through L4 and the arrows a through d.

Accordingly, in the periphery section of the display screen, antenna storage sections that are not provided with an electromagnetic shield are constructed integrally with the main body section 11, and the antennas 15a and 15b are contained inside the antenna storage sections. This can improve the communication sensitivity and can also improve the transmitting/receiving sensitivity in all directions by ensuring enough space for the arrangement. Further, the antenna structure does not cause the antenna to change in the direction in which the antennas are pointed nor break due to contact with an external substance. For example, because the region, on which the heat release opening 17 at the bottom part of the main body section 11 as illustrated in FIG. 1 is provided, is in the periphery section of the liquid panel section 13 and the region is outside the edge section of the display screen, the region is not electromagnetically shielded in the same manner as the speaker storage sections 12a and 12b. Therefore, it is possible to provide the antennas 15a and 15b to this part.

In the liquid crystal television device 10 of the present embodiment, the speaker storage sections 12a and 12b for storing the speakers 14a and 14b are also used as the antenna storage sections. This makes it unnecessary to add a particular space for containing the antennas in the wireless communication device. Moreover, this can improve the design, compared with the arrangement in which the antenna storage sections, which is separate from the speaker storage sections 12a and 12b, are provided in the periphery section of the display screen.

In the embodiment of the present invention, one antenna is provided in each of the right and left speaker storage sections 12a and 12b. However, a number of antennas provided in each of the speaker storage sections 12a and 12b (provided in each of the antenna storage sections) may be plural, according to the strength of the electric wave to be received and an audio-visual environment of the liquid crystal display device 10. Moreover, a number of antenna storage sections may be single or plural. When two antennas are provided in each of the left and right speaker storage sections, for example, the directions of installation of the two antennas on each of left and right sides may be arranged to be different by 90 degrees. This can better improve usability because flexibility of usage, in which a position of installation and a direction of the installation are not limited, increases in a case where the wireless communication device is used as a portable type.

Moreover, in the embodiment of the present invention, the antennas are provided in directions different from each other by 90 degrees so that the usage is not limited by a kind of a wave front of a polarized wave in an electric wave arrived. However, the direction of the installation is not specifically limited to this. The direction of the installation may be determined so that the transmitting/receiving sensitivity in all directions becomes high. The antennas may be arranged in the same one direction. In this case, a width (depth) of a space in which the antennas are installed can be reduced. Accordingly, the antennas can be utilized in a thin-model device such as a liquid crystal television without detracting from the feature of the device being thin.

According to this embodiment, two antennas, which are the antennas 15a and 15b, are provided. However, only one antenna may be provided. In this case, naturally the number of the antenna storage section provided is also one.

This embodiment is explained by an example in which the antennas are mounted on the liquid crystal television device. However, the device mounting the antennas is not limited to this. For example, the present invention is preferably applied to portable devices, such as an EL television device, a PDP television device, a CRT television device, mobile phones, and mobile terminal devices, which can be carried around.

The present invention, in other words, can be described as follows. In a wireless communication device (first wireless communication device), non-electromagnetically shielded sections are provided on external sides of a display screen in a main body section including the display screen displaying a picture image. In each of the non-electromagnetically shielded sections, an antenna is provided.

Moreover, according to the present invention, in the wireless communication device (second wireless communication device), ventilation sections made of plural through-holes are provided on the outer side of a display screen in a main body section including the display screen that displays a picture image. In each of the ventilation sections, an antenna is provided.

According to the present invention, in these first and second wireless communication devices, speaker storage sections are further provided on both left and right sides of the display screen and the antennas are respectively provided inside the speaker storage sections (third wireless communication device).

In the third wireless communication device, furthermore, one of the antennas is provided in each of the speaker storage sections, and the directions of the installation of the antennas are different from each other by 90 degrees.

Further, in the same manner, in the third wireless communication device, (i) one antenna is stored in each of the speaker storage sections and the directions of installation of the antennas are different from each other by 90 degrees and also, (ii) in a state where one antenna is provided in each of the speaker storage sections, one of the antennas has directivity in a horizontal plane stronger than directivity in a vertical plane, whereas the other antenna has the directivity in the vertical plane stronger than the directivity in the horizontal plane.

In the first to third wireless communication devices, the antenna is either an inverted L antenna or an inverted F antenna at least. The antennas are provided on both right and left sides of the main body section by either one of a combination of the same antennas or a combination of different antennas.

In the third wireless communication device, the antennas may be provided in the speaker storage sections so as to provide protrusions from plane surface sections on which the speakers are installed. The plane surface sections on which the speakers are provided are surfaces parallel to the opening faces of the speakers in the speaker storage sections 12a and 12b in which the speakers 14a and 14b are installed. The plane surface sections are also parallel to the display surface. This arrangement can improve the sensitivity for receiving an electric wave even when a small plate-like plane antenna is installed in a storage section with a limited space.

Furthermore, in the first to third wireless communication devices, the antennas serve as a diversity antenna.

In this way, according to the present invention, the antennas are provided in non-electromagnetically shielded sections provided on the external sides of the display screen in the main body section, or, the antennas are provided in the ventilation sections provided on the outside of the display screen in the main body section. Therefore, the antennas are not influenced by an electromagnetic shield. Accordingly, it is possible to better improve the communication sensitivity of the antennas. Moreover, because the antennas are not exposed to the outside of the main body of the display device, the problem of the direction of the antenna changing or the antenna breaking upon contact with an external object and the like can be ameliorated.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention can be preferably applied to portable devices, such as liquid crystal television devices, EL television devices, PDP television devices, CRT television devices, mobile phones, and mobile terminal devices, which can be carried around.

The invention claimed is:

1. A wireless communication device comprising:
antenna storage sections, which are formed integrally with a main body of the device and which are not electromagnetically shielded, in a periphery section of a display screen in the main body of the device containing a display section including the display screen, wherein
the antenna storage sections provided on both left and right sides of the display screen are also used as speaker storage sections and an antenna(s), and a speaker are stored in each of the antenna storage sections.

2. The wireless communication device as set forth in claim 1 wherein:
one antenna or plural antennas is/are provided in each of the antenna storage sections.

3. The wireless communication device as set forth in claim 2, wherein:
directions of installation of two of the antennas provided in the same antenna storage section or different antenna storage sections differ from each other by 90 degrees.

4. The wireless communication device as set forth in claim 1, wherein:
directions of installation of two of the antennas provided in the same antenna storage section or different antenna storage sections differ from each other by 90 degrees.

5. The wireless communication device as set forth in claim 4, wherein:
in a state in which one antenna is provided inside each of the speaker storage sections, one of the antennas has directivity in a horizontal plane stronger than directivity in a vertical plane and the other one of the antennas has the directivity in the vertical plane stronger than the directivity in the horizontal plane.

6. The wireless communication device as set forth in claim 1, wherein:
plural antennas provided inside the same antenna storage section or different antenna storage sections construct a diversity antenna.

7. The wireless communication device as set forth in claim 1, wherein:
the antenna is either an inverted L antenna or an inverted F antenna.

8. A wireless communication device comprising:
antenna storage sections, which are formed integrally with a main body of the device and which include ventilation sections made of plural through-holes, in a periphery section of a display screen in the main body of the device containing a display section including the display screen, wherein
the antenna storage sections provided on both left and right sides of the display screen are also used as speaker storage sections, and an antenna(s) and a speaker are stored in each of the antenna storage sections.

9. The wireless communication device as set forth in claim 8 wherein:
one antenna or plural antennas is/are provided in each of the antenna storage sections.

10. The wireless communication device as set forth in claim 8, wherein:
directions of installation of two of the antennas provided in the same antenna storage section or different antenna storage sections differ from each other by 90 degrees.

11. A wireless communication device comprising:
antenna storage sections, which are formed integrally with a main body of the device and which is not electromagnetically shielded, in a periphery section of a display screen in the main body of the device containing a display section including the display screen; and
antennas being provided inside the antenna storage sections, wherein
directions of installation of the antennas provided in different antenna storage sections are different from each other by 90 degrees, and in a state in which one antenna is provided inside each of the speaker storage sections, one of the antennas has directivity in a horizontal plane stronger than directivity in a vertical plane and the other one of the antennas has the directivity in the vertical plane stronger than the directivity in the horizontal plane.

12. The wireless communication device as set forth in claim 11, wherein:
the antenna storage sections are provided on both of the left and right sides of the display screen.

13. A wireless communication device comprising:
antenna storage sections, which are formed integrally with a main body of the device and which include ventilation sections made of plural through-holes, in a periphery section of a display Screen in the main body of the device containing a display section including the display screen,
antennas being provided inside the antenna storage sections, wherein
directions of installation of the antennas provided in different antenna storage sections are different from each other by 90 degrees, and in a state in which one antenna is provided inside each of the speaker storage sections, one of the antennas has directivity in a horizontal plane stronger than directivity in a vertical plane and the other one of the antennas has the directivity in the vertical plane stronger than the directivity in the horizontal plane.

14. The wireless communication device as set forth in claim 13, wherein:
the antenna storage sections are provided on both of the left and right sides of the display screen.

* * * * *